United States Patent
Gujar et al.

(10) Patent No.: US 12,474,063 B2
(45) Date of Patent: Nov. 18, 2025

(54) COOKING APPLIANCE

(71) Applicant: WHIRLPOOL CORPORATION, Benton Harbor, MI (US)

(72) Inventors: Pranav A. Gujar, Pune (IN); Pavan M. Meti, Pimpri-Chinchwad (IN); Karan S. Ratan, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 658 days.

(21) Appl. No.: 17/813,151

(22) Filed: Jul. 18, 2022

(65) Prior Publication Data

US 2024/0019129 A1  Jan. 18, 2024

(51) Int. Cl.
 *F24C 15/08* (2006.01)
 *A47J 37/06* (2006.01)
 *F24C 15/00* (2006.01)

(52) U.S. Cl.
 CPC ........... *F24C 15/08* (2013.01); *A47J 37/0623* (2013.01)

(58) Field of Classification Search
 CPC ...... F24C 15/08; F24C 15/005; A47J 37/0623
 USPC .......................................................... 126/19
 See application file for complete search history.

(56) References Cited

U.S. PATENT DOCUMENTS

| | | | |
|---|---|---|---|
| 3,873,949 A | 3/1975 | Dorsi et al. | |
| 4,057,772 A | 11/1977 | Basil, Jr. et al. | |
| 4,423,398 A | 12/1983 | Jachowski et al. | |
| 4,706,053 A | 11/1987 | Giavarini | |
| 5,968,402 A | 10/1999 | Lee | |
| 6,392,203 B1 * | 5/2002 | Schmidmayer | F24C 7/06 219/405 |
| 8,410,404 B2 | 4/2013 | Back et al. | |
| 2011/0266271 A1 * | 11/2011 | Boyer | F24C 15/00 219/393 |

FOREIGN PATENT DOCUMENTS

| | | |
|---|---|---|
| DE | 3231462 C1 | 5/1984 |
| DE | 102008041965 A1 | 3/2010 |
| EP | 429994 B1 | 6/1994 |
| EP | 1126748 A2 | 8/2001 |
| ES | 2526620 A | 1/2015 |
| WO | 2014041460 5 | 3/2014 |
| WO | 2021152083 A2 | 8/2021 |

* cited by examiner

*Primary Examiner* — Edelmira Bosques
*Assistant Examiner* — Christopher S Arsenault
(74) *Attorney, Agent, or Firm* — Price Heneveld LLP

(57) ABSTRACT

A cooking appliance includes a metal body defining a cooking cavity and including a bottom wall that extends from an interior surface defining an upward-facing depression to an exterior surface opposite the interior surface. The bottom wall of the metal body has a first thermal expansion coefficient and a first elastic modulus. A first deformation restriction patch extends along the interior surface of the bottom wall within the upward-facing depression and has a second thermal expansion coefficient and a second elastic modulus. A second deformation restriction patch extends along the exterior surface of the bottom wall opposite the first deformation restriction patch and has a third thermal expansion coefficient and a third elastic modulus.

10 Claims, 3 Drawing Sheets

COOKING APPLIANCE

BACKGROUND OF THE DISCLOSURE

The present disclosure generally relates to a cooking appliance. More specifically, the present disclosure relates to a cooking appliance that includes a metal body and a deformation restriction patch disposed on a surface of the metal body.

SUMMARY OF THE DISCLOSURE

According to one aspect of the present disclosure, a cooking appliance includes: a metal body that defines a cooking cavity and includes a bottom wall that extends from an interior surface that defines an upward-facing depression to an exterior surface opposite the interior surface, wherein the bottom wall of the metal body has a first thermal expansion coefficient and a first elastic modulus; a first deformation restriction patch that extends along the interior surface of the bottom wall within the upward-facing depression, wherein the first deformation restriction patch has a second thermal expansion coefficient and a second elastic modulus; and a second deformation restriction patch that extends along the exterior surface of the bottom wall opposite the first deformation restriction patch, wherein the second deformation restriction patch has a third thermal expansion coefficient and a third elastic modulus, and wherein the first thermal expansion coefficient is greater than the second thermal expansion coefficient, the first elastic modulus is less than the second elastic modulus, the first thermal expansion coefficient is greater than the third thermal expansion coefficient, and the first elastic modulus is less than the third elastic modulus.

According to another aspect of the present disclosure, a cooking appliance includes: a metal body that is configured to define a cooking cavity and that includes a wall that extends from an interior surface to an exterior surface opposite the interior surface, wherein the wall of the metal body has a first thermal expansion coefficient and a first elastic modulus; a first deformation restriction patch that extends along the interior surface of the wall, wherein the first deformation restriction patch has a second thermal expansion coefficient and a second elastic modulus; and a second deformation restriction patch that extends along the exterior surface of the wall opposite the first deformation restriction patch, wherein the second deformation restriction patch has a third thermal expansion coefficient and a third elastic modulus, and wherein the first thermal expansion coefficient is greater than the second thermal expansion coefficient, the first elastic modulus is greater than the second elastic modulus, the first thermal expansion coefficient is greater than the third thermal expansion coefficient, and the first elastic modulus is greater than the third elastic modulus.

According to yet another aspect of the present disclosure, a cooking appliance includes: a metal body that is configured to define a cooking cavity and that includes a wall that extends from an interior surface to an exterior surface opposite the interior surface, wherein the wall of the metal body has a first thermal expansion coefficient and a first elastic modulus; and at least one deformation restriction patch that extends along at least one of the interior surface of the wall and the exterior surface of the wall, wherein the at least one deformation restriction patch has a second thermal expansion coefficient and a second elastic modulus, and wherein the first thermal expansion coefficient is greater than the second thermal expansion coefficient, and the first elastic modulus is at least one of greater than the second elastic modulus and less than the second elastic modulus.

These and other features, advantages, and objects of the present disclosure will be further understood and appreciated by those skilled in the art by reference to the following specification, claims, and appended drawings.

Figure 1:
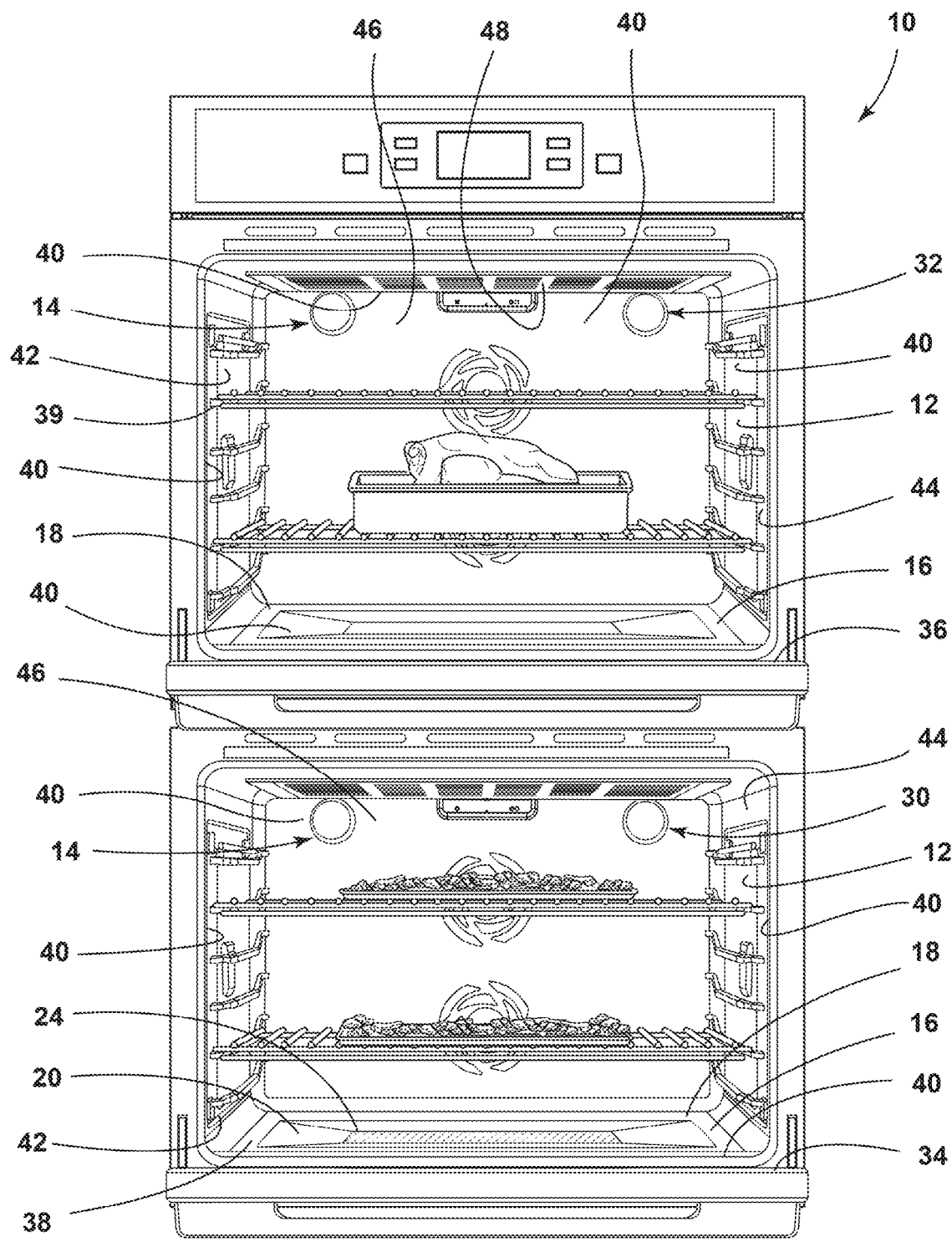
FIG. 1 is a front elevational view of a cooking appliance that includes a first cooking cavity and a second cooking cavity disposed above the first cooking cavity.

The components in the figures are not necessarily to scale, emphasis instead being placed upon illustrating the principles described herein.

DETAILED DESCRIPTION

The present illustrated embodiments reside primarily in combinations of apparatus components related to a cooking appliance. Accordingly, the apparatus components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
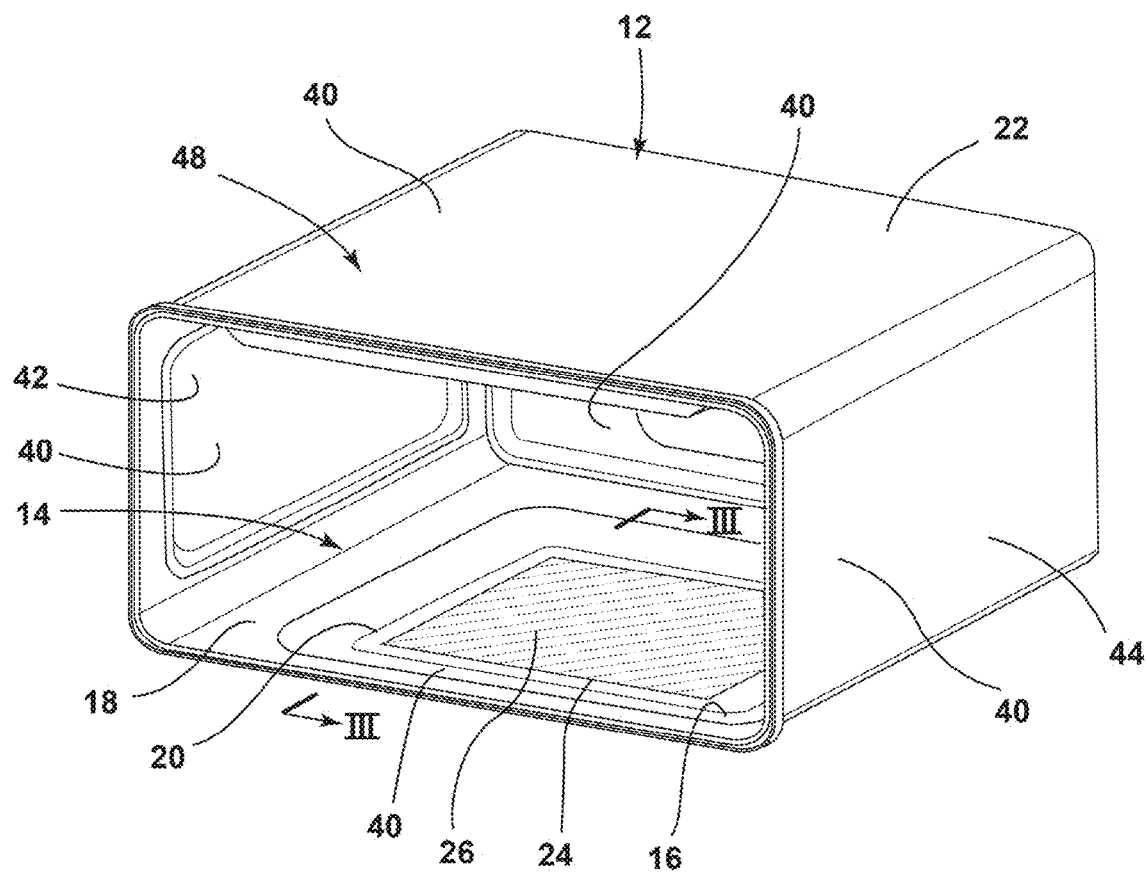
FIG. 2 is a top perspective view of a metal body of a cooking appliance that includes a bottom wall that defines a depression, and a deformation restriction patch that is disposed on a surface of the bottom wall within the depression.
Figure 3:
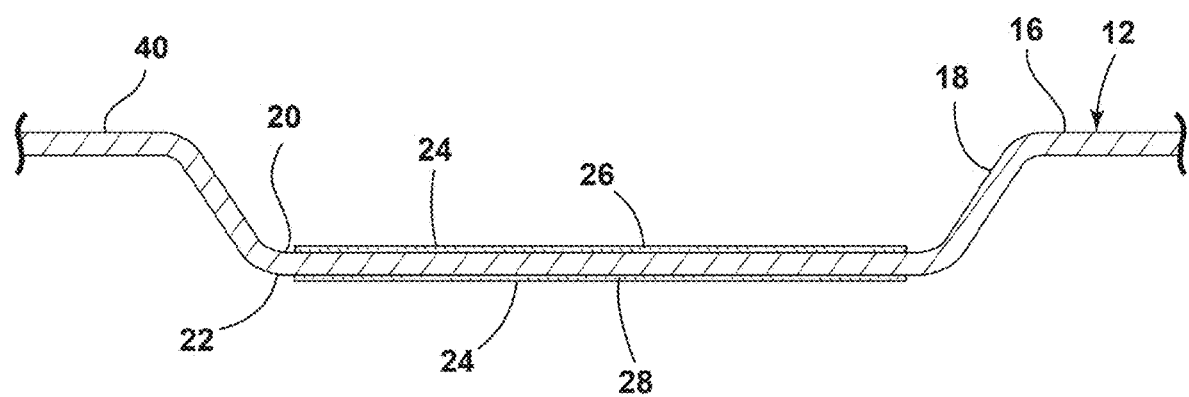
FIG. 3 is a cross-sectional view of the bottom wall of the body of FIG. 2 taken at line III-III of FIG. 2 that illustrates the bottom wall that defines a depression, a first deformation restriction patch that is disposed on an interior surface of the bottom wall, and a second deformation restriction patch that is disposed on an exterior surface of the bottom wall.

Referring to FIGS. 1-3, reference numeral 10 generally designates a cooking appliance. The cooking appliance 10 includes a metal body 12 that defines a cooking cavity 14 and includes a bottom wall 16. The bottom wall 16 extends from an interior surface 18 that defines an upward-facing depression 20 to an exterior surface 22 that is opposite the interior surface 18. The bottom wall 16 of the metal body 12 has a first thermal expansion coefficient and a first elastic modulus. The cooking appliance 10 includes a first deformation restriction patch 26 that extends along the interior surface 18 of the bottom wall 16 within the upward-facing depression 20. The first deformation restriction patch 26 has a second thermal expansion coefficient and a second elastic modulus. The cooking appliance 10 includes a second deformation restriction patch 28 that extends along the exterior surface 22 of the bottom wall 16 opposite the first deformation restriction patch 26. The second deformation restriction patch 28 has a third thermal expansion coefficient and a third elastic modulus. The first thermal expansion coefficient is greater than the second thermal expansion coefficient. The first elastic modulus is less than the second elastic modulus. The first thermal expansion coefficient is greater than the third thermal expansion coefficient. The first elastic modulus is less than the third elastic modulus.

Referring now to FIG. 1, the cooking appliance 10 includes the cooking cavity 14. In some implementations, the cooking appliance 10 can include a plurality of cooking cavities 14. For example, as illustrated in FIG. 1, the cooking appliance 10 is a double oven that includes a first cooking cavity 30 and a second cooking cavity 32 that is positioned above the first cooking cavity 30. In the illustrated embodiment, the first cooking cavity 30 is a lower cooking cavity and the second cooking cavity 32 is an upper cooking cavity. However, it is contemplated that the first cooking cavity 30 may be the upper cooking cavity and the second cooking cavity 32 may be the lower cooking cavity, in some implementations. In various embodiments, the cooking appliance 10 can include at least one heating element that is configured to heat the at least one cooking cavity 14. Further, as illustrated in FIG. 1, the cooking appliance 10 includes first and second doors 34, 36 that can be closed and opened to deny and provide access to the first and second cooking cavities 30, 32, respectively.

Referring now to FIGS. 1 and 2, in various embodiments, the cooking appliance 10 includes a body 12 that defines the cooking cavity 14. In the embodiment illustrated in FIG. 1, the cooking appliance 10 includes first and second bodies 38, 39 that respectively define the first and second cooking cavities 30, 32. In various embodiments, the body 12 of the cooking appliance 10 that defines the cooking cavity 14 can be a metal body 12. A variety of types of metals are contemplated. In various embodiments, the metal body 12 is formed of steel. In the embodiment illustrated in FIG. 2, the metal body 12 is formed of cold-rolled steel, mild unalloyed deep drawing steel.

The body 12 of the cooking appliance 10 that defines the cooking cavity 14 can include a plurality of walls 40. For example, in the embodiment illustrated in FIG. 2, the body 12 includes a first side wall 42, a second sidewall 44 opposite the first side wall 42, a back wall 46 opposite an opening to the cooking cavity 14 and extending between the first and second side walls 42, 44, a top wall 48 that extends between the first and second side walls 42, 44, and a bottom wall 16 opposite the top wall 48. It is contemplated that the body 12 can be an assembly of a plurality of components. For example, the back wall 46 and the top wall 48 may be distinct components that are coupled to another component of the body 12 that forms the first and second side walls 42, 44 and the bottom wall 16 of the body 12.

Referring still to FIG. 2, in some implementations, the wall 40 of the body 12 can define a depression 20. The depression 20 can be in fluid communication with the cooking cavity 14 defined by the cooking appliance 10. For example, the wall 40 of the metal body 12 can include an interior surface 18 and an exterior surface 22 opposite the interior surface 18, and the interior surface 18 of the wall 40 can define the depression 20. In the embodiment illustrated in FIG. 2, the interior surface 18 of the bottom wall 16 of the metal body 12 defines the upward-facing depression 20. In the illustrated embodiment, the depression 20 is generally stadium shaped and includes a substantially planar floor. A variety of shapes of depressions 20 are contemplated.

Referring now to FIGS. 2 and 3, the cooking appliance 10 can include a deformation restriction patch 24. In some implementations, the cooking appliance 10 can include a plurality of deformation restriction patches 24. For example, the cooking appliance 10 can include a first deformation restriction patch 26 and a second deformation restriction patch 28, as described further herein. The deformation restriction patch 24 extends along at least one of the interior surface 18 of the wall 40 of the body 12 and the exterior surface 22 of the wall 40 of the body 12. In the embodiment illustrated in FIG. 2, the deformation restriction patch 24 is illustrated extending along the interior surface 18 of the bottom wall 16 of the body 12. In some implementations, wherein the wall 40 of the cooking appliance 10 defines the depression 20, the deformation restriction patch 24 extends along the portion of the wall 40 that defines the depression 20. In the embodiment illustrated in FIG. 2, the deformation restriction patch 24 is disposed wholly along the portion of the interior surface 18 of the bottom wall 16 that defines the upward-facing depression 20.

Referring still to FIGS. 2 and 3, in various embodiments, the cooking appliance 10 includes the first deformation restriction patch 26 and the second deformation restriction patch 28. The first deformation restriction patch 26 can extend along an interior surface 18 of the wall 40 of the body 12, and the second deformation restriction patch 28 can extend along the exterior surface 22 of the wall 40 of the body 12 opposite the first deformation restriction patch 26. As illustrated in FIG. 2, the first deformation restriction patch 26 extends along the interior surface 18 of the bottom wall 16 within the upward-facing depression 20, and the second deformation restriction patch 28 extends along the exterior surface 22 of the bottom wall 16 opposite the first deformation restriction patch 26. The first and/or second deformation restriction patches 26, 28 can have a variety of thicknesses. In various embodiments, the first and/or second deformation restriction patches 26, 28 can have thicknesses less than 1 mm. In some embodiments, the first and/or second deformation restriction patches 26, 28 can have thicknesses of about 0.5 mm. In the embodiment illustrated in FIG. 3, the first and second deformation restriction patches 26, 28 each have a thickness of about 0.25 mm. The first and/or second deformation restriction patches 26, 28 can be one or more of a variety of shapes, in various implementations. For example, in some implementations, from a top-down perspective, the first and/or second deformation restriction patches 26, 28 can be generally circular in shape. In some embodiments, the first and/or second deformation restriction patches 26, 28 can be polygon shaped. In the embodiment illustrated in FIG. 2, the deformation restriction patch 24 is substantially rectangular in shape from a top-down perspective. A variety of shapes are contemplated. In various embodiments, the first and/or second deformation restriction patches 26, 28 can be generally permanently coupled with the body 12.

In various embodiments, the wall 40 of the metal body 12 that the at least one deformation restriction patch 24 extends along has a first thermal expansion coefficient and a first elastic modulus. The at least one deformation restriction patch 24 that extends along the wall 40 of the metal body 12 can have a second thermal expansion coefficient and a second elastic modulus. In some implementations, the first thermal expansion coefficient is greater than the second thermal expansion coefficient and the first elastic modulus is at least one of greater than the second elastic modulus and less than the second elastic modulus. In some embodiments, wherein the cooking appliance 10 includes the first deformation restriction patch 26 and the second deformation restriction patch 28, the wall 40 of the metal body 12 has a first thermal expansion coefficient and a first elastic modulus, the first deformation restriction patch 26 has a second thermal expansion coefficient and a second elastic modulus, and the second deformation restriction patch 28 has a third thermal expansion coefficient and a third elastic modulus. In some implementations, the first thermal expansion coefficient is greater than the second thermal expansion coefficient, the first elastic modulus is less than the second elastic modulus, the first thermal expansion coefficient is greater than the third thermal expansion coefficient, and the first elastic modulus is less than the third elastic modulus. In some implementations, the first thermal expansion coefficient is greater than the second thermal expansion coefficient, the first elastic modulus is greater than the second elastic modulus, the first thermal expansion coefficient is greater than the third thermal expansion coefficient, and the first elastic modulus is greater than the third elastic modulus.

In some embodiments, the thermal expansion coefficient of the wall 40 of the metal body 12 is between about 0.000009 per degree Celsius and about 0.000018 per degree Celsius. In some examples, the elastic modulus of the wall 40 of the metal body 12 is between about 180 and about 220 Giga Pascals. For example, the wall of the metal body 12 can be formed of cold rolled, mild unalloyed deep drawing steel that has a thermal expansion coefficient of about 0.000012 per degree Celsius and an elastic modulus of about 210 Giga Pascals. It is contemplated that the wall 40 of the metal body 12 can be formed of a variety of materials having various thermal expansion coefficient and elastic modulus values.

In some implementations, the thermal expansion coefficient of the at least one deformation restriction patch 24 can be less than about 0.000008 per degree Celsius, and the elastic modulus of the at least one deformation restriction patch 24 can be greater than about 300 Giga Pascals. In some examples, the thermal expansion coefficient of the at least one deformation restriction patch 24 is about 0.0000077 per degree Celsius, and the elastic modulus of the at least one deformation restriction patch 24 is about 310 Giga Pascals. For example, in an exemplary embodiment, the at least one deformation restriction patch 24 is formed of ceramic consisting of about 95% alumina and has a thermal expansion coefficient of about 0.0000077 per degree Celsius and an elastic modulus of about 310 Giga Pascals.

In some implementations, the deformation restriction patch 24 can have a thermal expansion coefficient that is less than about 0.0000055 per degree Celsius and an elastic modulus that is less than about 150 Giga Pascals. For example, the at least one deformation restriction patch 24 can be formed of zirconia porcelain and have a thermal expansion coefficient of about 0.0000035 per degree Celsius and an elastic modulus of about 137 Giga Pascals.

In operation of the cooking appliance 10, the at least one deformation restriction patch 24 can inhibit deformation of the wall 40 of the metal body 12 due to temperature increases within the cooking cavity 14, which can reduce the volume of a popping noise that results from deformation of the wall 40 of the metal body 12.

EXAMPLES

The following are non-limiting examples of the cooking appliance.

Example A

In one example, Example A (Ex. A), the cooking appliance 10 included the cold rolled mild unalloyed deep drawing steel metal body 12 with the bottom wall 16 defining the upward-facing depression 20 without any deformation restriction patches 24 disposed thereon. The bottom wall 16 of the cold rolled, mild unalloyed deep drawing steel metal body 12 had a thermal expansion coefficient of about 0.000012 per degree Celsius and an elastic modulus of about 210 Giga Pascals. Heating the cooking cavity 14 during operation of the cooking appliance 10 resulted in the bottom wall 16 of the metal body 12 deforming 8.02 mm in the vertical direction, which produced a noise of a baseline volume.

Example B

In another example, Example B (Ex. B), the cooking appliance 10 was equipped with a deformation restriction patch 24. The deformation restriction patch 24 was formed of zirconia porcelain and had a thickness of about 0.5 mm. The zirconia porcelain deformation restriction patch 24 had a thermal expansion coefficient (0.0000035 per degree Celsius) that was less than a thermal expansion coefficient of the bottom wall 16 of the metal body 12 (0.000012 per degree Celsius). Further, the deformation restriction patch 24 had an elastic modulus (137 Giga Pascals) that was less than the elastic modulus of the bottom wall 16 of the metal body 12 (210 Giga Pascals). The deformation restriction patch 24 extended along the portion of the interior surface 18 of the bottom wall 16 that defines the upward-facing depression 20. Heating the cooking cavity 14 of the cooking appliance 10 resulted in a maximum deformation of the bottom wall 16 in the vertical direction of 4.53 mm.

Example C

In another example, Example C (Ex. C), the cooking appliance 10 was equipped with a first deformation restriction patch 26 and a second deformation restriction patch 28. The first and second deformation restriction patches 26, 28 were formed of zirconia porcelain and had thicknesses of about 0.25 mm. The first and second deformation restriction patches 26, 28 each had a thermal expansion coefficient (0.0000035 per degree Celsius) that was less than a thermal expansion coefficient of the bottom wall 16 of the metal body 12 (0.000012 per degree Celsius). Further, the first and second deformation restriction patches 26, 28 each had an elastic modulus (137 Giga Pascals) that was less than the elastic modulus of the bottom wall 16 of the metal body 12

(210 Giga Pascals). The first deformation restriction patch 26 extended along the portion of the interior surface 18 of the bottom wall 16 that defines the upward-facing depression 20. The second deformation restriction patch 28 was disposed on the exterior surface 22 of the bottom wall 16 opposite the first deformation restriction patch 26. Heating the cooking cavity 14 of the cooking appliance 10 resulted in a maximum vertical deformation of the bottom wall 16 of 2.65 mm.

Example D

In another example, Example D (Ex. D), the cooking appliance 10 was equipped with a first deformation restriction patch 26 and a second deformation restriction patch 28. The first and second deformation restriction patches 26, 28 were formed of ceramic consisting of 95% alumina and had thicknesses of about 0.25 mm. The first and second deformation restriction patches 26, 28 each had a thermal expansion coefficient (0.0000077 per degree Celsius) that was less than a thermal expansion coefficient of the bottom wall 16 of the metal body 12 (0.000012 per degree Celsius). Further, the first and second deformation restriction patches 26, 28 each had an elastic modulus (310 Giga Pascals) that was greater than the elastic modulus of the bottom wall 16 of the metal body 12 (210 Giga Pascals). The first deformation restriction patch 26 extended along the portion of the interior surface 18 of the bottom wall 16 that defines the upward-facing depression 20. The second deformation restriction patch 28 was disposed on the exterior surface 22 of the bottom wall 16 opposite the first deformation restriction patch 26. Heating the cooking cavity 14 of the cooking appliance 10 resulted in a maximum vertical deformation of the bottom wall 16 of 3.15 mm.

Based on the example cooking appliances 10, application of at least one deformation restriction patch 24 to the bottom wall 16 of the metal body 12 decreased the deformation of the bottom wall 16 during heating of the cooking cavity 14. Further, deformation restriction patches 24 with a thermal expansion coefficient that is less than the thermal expansion coefficient of the bottom wall 16 and an elastic modulus either greater or less than that of the bottom wall 16 reduced deformation more effectively than alternative deformation restriction patches. The decreased deformation of the bottom wall 16 of the metal body 12 resulted in decreased volume of the aforementioned popping noise that occurs during heating of the cooking appliance 10 by three to four decibels.

According to one aspect of the present disclosure, a cooking appliance includes: a metal body that defines a cooking cavity and includes a bottom wall that extends from an interior surface that defines an upward-facing depression to an exterior surface opposite the interior surface, wherein the bottom wall of the metal body has a first thermal expansion coefficient and a first elastic modulus; a first deformation restriction patch that extends along the interior surface of the bottom wall within the upward-facing depression, wherein the first deformation restriction patch has a second thermal expansion coefficient and a second elastic modulus; and a second deformation restriction patch that extends along the exterior surface of the bottom wall opposite the first deformation restriction patch, wherein the second deformation restriction patch has a third thermal expansion coefficient and a third elastic modulus, and wherein the first thermal expansion coefficient is greater than the second thermal expansion coefficient, the first elastic modulus is less than the second elastic modulus, the first thermal expansion coefficient is greater than the third thermal expansion coefficient, and the first elastic modulus is less than the third elastic modulus.

According to another aspect, the first thermal expansion coefficient is between about 0.000009 per degree Celsius and about 0.000018 per degree Celsius, and the first elastic modulus is between about 180 Giga Pascals and about 220 Giga Pascals.

According to another aspect, the second thermal expansion coefficient is less than about 0.000008 per degree Celsius, and the second elastic modulus is greater than about 300 Giga Pascals.

According to another aspect, the second thermal expansion coefficient is about 0.0000077 per degree Celsius, and the second elastic modulus is about 310 Giga Pascals.

According to another aspect, the third thermal expansion coefficient is less than about 0.000008 per degree Celsius, and the third elastic modulus is greater than about 300 Giga Pascals.

According to another aspect, the third thermal expansion coefficient is about 0.0000077 per degree Celsius, and the third elastic modulus is about 310 Giga Pascals.

According to another aspect, at least one of the first and second deformation restriction patches is formed of ceramic consisting of about 95% alumina.

According to another aspect, the first deformation restriction patch is disposed wholly along a portion of the interior surface of the bottom wall that defines the upward-facing depression.

According to another aspect of the present disclosure, a cooking appliance includes: a metal body that is configured to define a cooking cavity and that includes a wall that extends from an interior surface to an exterior surface opposite the interior surface, wherein the wall of the metal body has a first thermal expansion coefficient and a first elastic modulus; a first deformation restriction patch that extends along the interior surface of the wall, wherein the first deformation restriction patch has a second thermal expansion coefficient and a second elastic modulus; and a second deformation restriction patch that extends along the exterior surface of the wall opposite the first deformation restriction patch, wherein the second deformation restriction patch has a third thermal expansion coefficient and a third elastic modulus, and wherein the first thermal expansion coefficient is greater than the second thermal expansion coefficient, the first elastic modulus is greater than the second elastic modulus, the first thermal expansion coefficient is greater than the third thermal expansion coefficient, and the first elastic modulus is greater than the third elastic modulus.

According to another aspect, the first thermal expansion coefficient is between about 0.000009 per degree Celsius and about 0.000018 per degree Celsius, and the first elastic modulus is between about 180 Giga Pascals and about 220 Giga Pascals.

According to another aspect, the second thermal expansion coefficient is less than about 0.0000055 per degree Celsius, and the second elastic modulus is less than about 150 Giga Pascals.

According to another aspect, the second thermal expansion coefficient is about 0.0000035 per degree Celsius, and the second elastic modulus is about 137 Giga Pascals.

According to another aspect, the third thermal expansion coefficient is less than about 0.0000055 per degree Celsius, and the third elastic modulus is less than about 150 Giga Pascals.

According to another aspect, the third thermal expansion coefficient is about 0.0000035 per degree Celsius, and the third elastic modulus is about 137 Giga Pascals.

According to another aspect, at least one of the first and second deformation restriction patches is formed of zirconia porcelain.

According to yet another aspect of the present disclosure, a cooking appliance includes: a metal body that is configured to define a cooking cavity and that includes a wall that extends from an interior surface to an exterior surface opposite the interior surface, wherein the wall of the metal body has a first thermal expansion coefficient and a first elastic modulus; and at least one deformation restriction patch that extends along at least one of the interior surface of the wall and the exterior surface of the wall, wherein the at least one deformation restriction patch has a second thermal expansion coefficient and a second elastic modulus, and wherein the first thermal expansion coefficient is greater than the second thermal expansion coefficient, and the first elastic modulus is at least one of greater than the second elastic modulus and less than the second elastic modulus.

According to another aspect, the interior surface of the metal body defines a depression, and the at least one deformation restriction patch is disposed wholly along the portion of the interior surface of the metal body that defines the depression.

According to another aspect, the first elastic modulus is greater than the second elastic modulus.

According to another aspect, the first elastic modulus is less than the second elastic modulus.

According to another aspect, the metal body is formed of steel and the at least one deformation restriction patch is formed of at least one of a ceramic consisting of about 95% alumina and zirconia porcelain.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary & bounded (unibody construction) in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless stated otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooking appliance, comprising:
   a metal body that defines a cooking cavity and includes a bottom wall that extends from an interior surface that defines an upward-facing depression to an exterior surface opposite the interior surface, wherein the bottom wall of the metal body has a first thermal expansion coefficient and a first elastic modulus;
   a first deformation restriction patch that extends along the interior surface of the bottom wall within the upward-facing depression, wherein the first deformation restriction patch has a second thermal expansion coefficient and a second elastic modulus; and
   a second deformation restriction patch that extends along the exterior surface of the bottom wall opposite the first deformation restriction patch, wherein the second deformation restriction patch has a third thermal expansion coefficient and a third elastic modulus, and wherein the first thermal expansion coefficient is greater than the second thermal expansion coefficient, the first elastic modulus is less than the second elastic modulus, the first thermal expansion coefficient is greater than the third thermal expansion coefficient, and the first elastic modulus is less than the third elastic modulus.

2. The cooking appliance of claim 1, wherein the first thermal expansion coefficient is between about 0.000009 per degree Celsius and about 0.000018 per degree Celsius, and the first elastic modulus is between about 180 Giga Pascals and about 220 Giga Pascals.

3. The cooking appliance of claim 2, wherein the second thermal expansion coefficient is less than about 0.000008 per degree Celsius, and the second elastic modulus is greater than about 300 Giga Pascals.

4. The cooking appliance of claim 3, wherein the second thermal expansion coefficient is about 0.0000077 per degree Celsius, and the second elastic modulus is about 310 Giga Pascals.

5. The cooking appliance of claim 3, wherein the third thermal expansion coefficient is less than about 0.000008 per degree Celsius, and the third elastic modulus is greater than about 300 Giga Pascals.

6. The cooking appliance of claim 4, wherein the third thermal expansion coefficient is about 0.0000077 per degree Celsius, and the third elastic modulus is about 310 Giga Pascals.

7. The cooking appliance of claim 1, wherein at least one of the first and second deformation restriction patches is formed of ceramic consisting of about 95% alumina.

8. The cooking appliance of claim 1, wherein the first deformation restriction patch is disposed wholly along a portion of the interior surface of the bottom wall that defines the upward-facing depression.

9. A cooking appliance, comprising: a metal body that is configured to define a cooking cavity and that includes a wall that extends from an interior surface to an exterior surface opposite the interior surface, wherein the wall of the metal body has a first thermal expansion coefficient and a first elastic modulus; and at least one deformation restriction patch that extends along at least one of the interior surface of the wall and the exterior surface of the wall, wherein the at least one deformation restriction patch has a second thermal expansion coefficient and a second elastic modulus, and wherein the first thermal expansion coefficient is greater than the second thermal expansion coefficient, and the first elastic modulus is at least one of greater than the second elastic modulus and less than the second elastic modulus, wherein the interior surface of the metal body defines a depression, and the at least one deformation restriction patch is disposed wholly along the portion of the interior surface of the metal body that defines the depression.

10. The cooking appliance of claim 9, wherein the first elastic modulus is less than the second elastic modulus.

* * * * *